(12) United States Patent
Shi

(10) Patent No.: US 11,365,091 B2
(45) Date of Patent: Jun. 21, 2022

(54) OVERSPEED PROTECTION SWITCH, OVERSPEED GOVERNOR ASSEMBLY AND ELEVATOR SYSTEM

(71) Applicant: Otis Elevator Company, Farmington, CT (US)

(72) Inventor: Zhengbao Shi, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 251 days.

(21) Appl. No.: 16/703,258

(22) Filed: Dec. 4, 2019

(65) Prior Publication Data

US 2020/0172376 A1 Jun. 4, 2020

(30) Foreign Application Priority Data

Dec. 4, 2018 (CN) .......................... 201811472310.8

(51) Int. Cl.
*B66B 5/04* (2006.01)
*F16H 21/16* (2006.01)

(52) U.S. Cl.
CPC .............. *B66B 5/044* (2013.01); *F16H 21/16* (2013.01)

(58) Field of Classification Search
CPC ..................................................... B66B 5/044
See application file for complete search history.

(56) References Cited

U.S. PATENT DOCUMENTS

| | | | |
|---|---|---|---|
| 2012/0061189 A1* | 3/2012 | Imfeld .................... | B66B 5/046 |
| | | | 187/350 |
| 2013/0098711 A1 | 4/2013 | Aguado et al. | |
| 2015/0329322 A1* | 11/2015 | Osmanbasic ........... | B66B 5/046 |
| | | | 187/373 |
| 2018/0029828 A1 | 2/2018 | Shi et al. | |
| 2019/0127179 A1* | 5/2019 | Shi ......................... | H01F 7/123 |

FOREIGN PATENT DOCUMENTS

| | | |
|---|---|---|
| CN | 1040195 C | 10/1998 |
| CN | 2786769 Y | 6/2006 |
| CN | 1860077 A | 11/2006 |
| CN | 1880208 A | 12/2006 |
| CN | 100335395 | 9/2007 |
| CN | 100537389 | 9/2009 |
| CN | 201395453 Y | 2/2010 |
| CN | 102196986 A | 9/2011 |

(Continued)

*Primary Examiner* — Diem M Tran
(74) *Attorney, Agent, or Firm* — Cantor Colburn LLP

(57) ABSTRACT

An overspeed protection switch, an overspeed governor assembly and an elevator system are provided by the present disclosure. The overspeed protection switch includes: a trigger device including a trigger member and at least one protrusion, wherein the trigger member is capable of rotating to a triggered position from an untriggered position when being toggled, and the at least one protrusion is connected to the trigger member and rotates together with the trigger member; an actuation device including an action end capable of performing a linear movement; and a reset member which is connected with the action end of the actuation device and is translated with the linear movement of the action end of the actuation device so as to push one of the at least one protrusion to drive the trigger member to return to the untriggered position from the triggered position.

12 Claims, 8 Drawing Sheets

(56) References Cited

FOREIGN PATENT DOCUMENTS

| | | | |
|---|---|---|---|
| CN | 103517864 | A | 1/2014 |
| CN | 203558668 | U | 4/2014 |
| CN | 203699594 | U | 7/2014 |
| CN | 103991770 | A | 8/2014 |
| CN | 104787638 | A | 7/2015 |
| CN | 104787640 | A | 7/2015 |
| CN | 204490245 | U | 7/2015 |
| CN | 104118784 | B | 8/2016 |
| CN | 105883527 | A | 8/2016 |
| CN | 105923493 | A | 9/2016 |
| CN | 105947826 | A | 9/2016 |
| CN | 105947828 | A | 9/2016 |
| CN | 105947830 | A | 9/2016 |
| CN | 106044449 | A | 10/2016 |
| CN | 106115407 | A | 11/2016 |
| CN | 106115408 | A | 11/2016 |
| CN | 104837757 | B | 12/2016 |
| CN | 106315335 | A | 1/2017 |
| CN | 106986249 | A | 7/2017 |
| CN | 107021395 | A | 8/2017 |
| CN | 107108154 | A | 8/2017 |
| CN | 105293247 | A | 11/2017 |
| CN | 107311005 | A | 11/2017 |
| CN | 105217407 | B | 1/2018 |
| CN | 105197718 | B | 4/2018 |
| CN | 108358008 | A | 8/2018 |
| CN | 108367892 | A | 8/2018 |
| CN | 108423512 | A | 8/2018 |
| CN | 111874773 | A * | 11/2020 |
| EP | 0662445 | A2 * | 7/1995 ............. B66B 5/048 |

* cited by examiner

… (US 11,365,091 B2)

OVERSPEED PROTECTION SWITCH, OVERSPEED GOVERNOR ASSEMBLY AND ELEVATOR SYSTEM

FOREIGN PRIORITY

This application claims priority to Chinese Patent Application No. 201811472310.8, filed Dec. 4, 2018, and all the benefits accruing therefrom under 35 U.S.C. § 119, the contents of which in its entirety are herein incorporated by reference.

FIELD OF THE INVENTION

The present disclosure relates to the field of elevator safety, and in particular to an overspeed governor assembly for an elevator, and an elevator having such overspeed governor assembly.

BACKGROUND OF THE INVENTION

With the development of overspeed governor assembly technology for elevators, a new Car-Mounted Governor (CMG) assembly has received a wider range of application. The CMG assembly is more compact in structure, as compared to conventional overspeed governor assemblies with or without a machine room. An overspeed governor assembly was disclosed by Aguado et al., in U.S. Patent Publication No. US 2013/0098711A1 published on Apr. 25, 2013, wherein the overspeed governor assembly includes a centrifugal mechanism which is gradually deployed as a rotational speed of a rope sheave increases. When the rope sheave reaches a first speed, an outer side of the centrifugal mechanism toggles an overspeed protection switch, thereby braking the elevator through an electrical mechanism. If the speed of the rope sheave continues to increase to a second speed, the centrifugal mechanism will drive a core ring on the inner side thereof, thereby triggering a mechanical brake device.

After the car is braked and the maintenance on the elevator is completed, the overspeed protection switch needs to be returned to an untriggered position so that the elevator can be operated again and protection can be provided when overspeed occurs for the next time.

SUMMARY OF THE INVENTION

An object of the present disclosure is to solve or at least alleviate the problems in the prior art.

In one aspect, an overspeed protection switch is provided, which includes: a trigger device including a trigger member and at least one protrusion, wherein the trigger member is capable of rotating to a triggered position from an untriggered position when being toggled, and the at least one protrusion is connected to the trigger member and rotates together with the trigger member; an actuation device including an action end capable of performing a linear movement; and a reset member which is connected with the action end of the actuation device and is translated with the linear movement of the action end of the actuation device so as to push one of the at least one protrusion to drive the trigger member to return to the untriggered position from the triggered position.

Optionally, in the overspeed protection switch, the reset member includes: a connection end connected with the action end of the actuation device; a push rod acting on the at least one protrusion; and at least one connection arm connected between the connection end and the push rod.

Optionally, in the overspeed protection switch, the connection end of the reset member is located behind the trigger device, the at least one connection arm includes a first connection arm and a second connection arm that surround the trigger device, and the push rod is located in front of the trigger device.

Optionally, in the overspeed protection switch, the first connection arm and the second connection arm form an L-shaped configuration, middle portions of the first connection arm and the second connection arm have longitudinal extension portion, and inner sides of the first connection arm and the second connection arm are provided with longitudinally extending bosses.

Optionally, in the overspeed protection switch, the trigger member is capable of rotating to a first triggered position in a first direction or rotating to a second triggered position in a second direction, and the at least one protrusion includes a first protrusion and a second protrusion, wherein in the first triggered position, the reset member will contact the first protrusion and drive the trigger member to return to the untriggered position from the first triggered position, and in the second triggered position, the reset member will contact the second protrusion and drive the trigger member to return to the untriggered position from the second triggered position.

Optionally, in the overspeed protection switch, the trigger device includes a housing and a rotating frame in the housing, the trigger member has an outer end and an inner end, and the inner end of the trigger member is connected to the rotating frame; the first protrusion and the second protrusion are arranged on the rotating frame, and extend to the outside of the housing through a track of the housing; and when the trigger member has been pushed by the reset member back to the untriggered position, the reset member contacts the first protrusion and the second protrusion simultaneously.

In another aspect, an overspeed governor assembly is provided, which includes: a rope sheave; a centrifugal mechanism mounted on the rope sheave and rotating together with the rope sheave; and an overspeed protection switch radially outward of the centrifugal mechanism by a certain distance, the overspeed protection switch including: a trigger device including a trigger member and at least one protrusion, wherein the trigger member is in an untriggered position when the overspeed governor assembly is in normal operation, and is capable of rotating to a triggered position from the untriggered position when being toggled by the centrifugal mechanism of the overspeed governor assembly in case of overspeed of the overspeed governor assembly, and the at least one protrusion is connected to the trigger member and rotates together with the trigger member; an actuation device including an action end capable of performing a linear movement; and a reset member which is connected with the action end of the actuation device and is translated with the linear movement of the action end of the actuation device so as to push one of the at least one protrusion to drive the trigger member to return to the untriggered position from the triggered position.

Optionally, in the overspeed governor assembly, the reset member includes: a connection end connected with the action end of the actuation device; a push rod acting on the at least one protrusion; and at least one connection arm connected between the connection end and the push rod.

Optionally, in the overspeed governor assembly, the connection end of the reset member is located behind the trigger device, the at least one connection arm includes a first connection arm and a second connection arm that surround the trigger device, and the push rod is located in front of the trigger device.

Optionally, in the overspeed governor assembly, the first connection arm and the second connection arm form an L-shaped configuration, middle portion of the first connection arm and the second connection arm have longitudinal extension portions, and inner sides of the first connection arm and the second connection arm are provided with longitudinally extending bosses.

Optionally, in the overspeed governor assembly, the trigger device is connected to an overspeed governor bracket via legs so that the trigger device is located in front of the actuation device.

Optionally, in the overspeed governor assembly, when in the untriggered position, the trigger member is capable of rotating to a first triggered position in a first direction or rotating to a second triggered position in a second direction, depending on a rotational direction of the centrifugal mechanism; the at least one protrusion includes a first protrusion and a second protrusion, wherein in the first triggered position, the reset member will contact the first protrusion and drive the trigger member to return to the untriggered position from the first triggered position, and in the second triggered position, the reset member will contact the second protrusion and drive the trigger member to return to the untriggered position from the second triggered position.

Optionally, in the overspeed governor assembly, the trigger device includes a housing and a rotating frame in the housing, the trigger member has an outer end and an inner end, and the inner end of the trigger member is connected to the rotating frame; the first protrusion and the second protrusion are arranged on the rotating frame, and extend to the outside of the housing through a track of the housing; and when the trigger member has been pushed by the reset member back to the untriggered position, the reset member contacts the first protrusion and the second protrusion simultaneously.

In another aspect, an elevator system is provided, which includes the overspeed governor assemblies according to embodiments of the present disclosure.

BRIEF DESCRIPTION OF THE DRAWINGS

The contents of the present disclosure will become more easily understood with reference to the accompanying drawings. Those skilled in the art can readily appreciate that the drawings are for illustrative purposes only, instead of being intended to limit the scope of protection of the present disclosure. In addition, similar numbers in the drawings are used to indicate similar parts, wherein.

DETAILED DESCRIPTION OF THE EMBODIMENT(S) OF THE INVENTION

It will be readily understood that, based on the technical solutions of the present disclosure, those skilled in the art can propose various alternative embodiments and implementations without departing from the true spirit of the present disclosure. Therefore, the following specific embodiments and the accompanying drawings are merely exemplary description of the technical solutions of the present disclosure, which shall not be deemed as the whole of the present disclosure or as limiting or restricting the technical solutions of the present disclosure.

Such orientation terms as upper, lower, left, right, front, rear, front side, back side, top, bottom or the like that are mentioned or may be mentioned in this description are defined with respect to the configurations shown in the individual drawings. They are relative concepts and thus possibly vary according to their different locations and different usage states. Therefore, these or other orientation terms shall not be interpreted as limiting terms.

Figure 1:
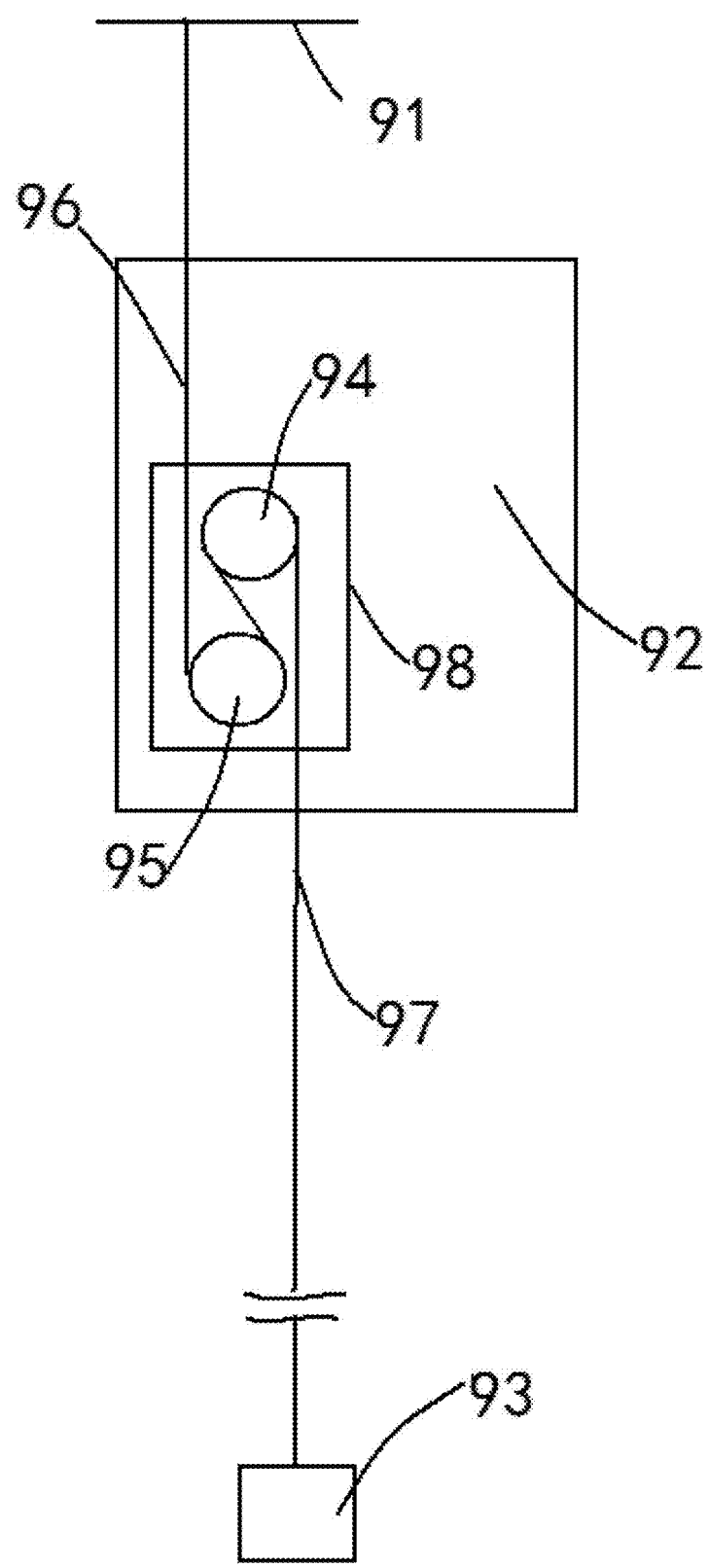
FIG. 1 shows a schematic view of an elevator system having a car-mounted overspeed governor.

First, referring to FIG. 1, an elevator system having a car-mounted overspeed governor assembly is illustrated. It should be understood that although a car-mounted overspeed governor assembly is described in various embodiments of the present disclosure, an overspeed protection switch of the present disclosure can be used in various types of overspeed governors, without being limited to those shown in the various figures or embodiments. A car 92 is shown in FIG. 1, with an overspeed governor assembly 98 mounted thereon. For a typical overspeed governor assembly 98, reference may be made to for example US Patent Publication No. US20130098711A1 with the publication date of Apr. 25, 2013 and the applicant of Otis Elevator Company, which is incorporated herein by reference in its entirety. The overspeed governor assembly 98 includes a guide sheave 95 and a governor rope sheave 94. A rope suspended from the top of a hoistway 91 wraps around the guide sheave 95 and the governor rope sheave 94. The rope includes an upstream rope portion 96 of the overspeed governor and a downstream rope portion 97 of the overspeed governor. The length of the upstream rope portion 96 of the overspeed governor and the length of the downstream rope portion 97 of the overspeed governor change constantly during the ascending or descending of the car. At the bottom of the hoistway, a bottom end of the downstream rope portion 97 of the overspeed governor is suspended with a weight 93 or is connected to a pulling device which provides a tension for the rope. During the ascending or descending of the car 92, the guide sheave 95 and the governor rope sheave 94 will rotate due to friction with the rope. A linear speed of a pitch circle rotation of the governor rope sheave 94 is consistent with a car running speed. When the ascending or descending speed of the elevator car exceeds a critical value, a centrifugal mechanism associated with the governor rope sheave 94 triggers an electrical brake device when a rotational speed of the rope sheave exceeds a first speed, cuts off power supply from an elevator drive motor, and stops a drive sprocket, and when the rotational speed of the rope sheave exceeds a second speed greater than the first speed, the centrifugal mechanism triggers a mechanical brake device to stop the elevator car by friction with a guide rail.

Figure 2:
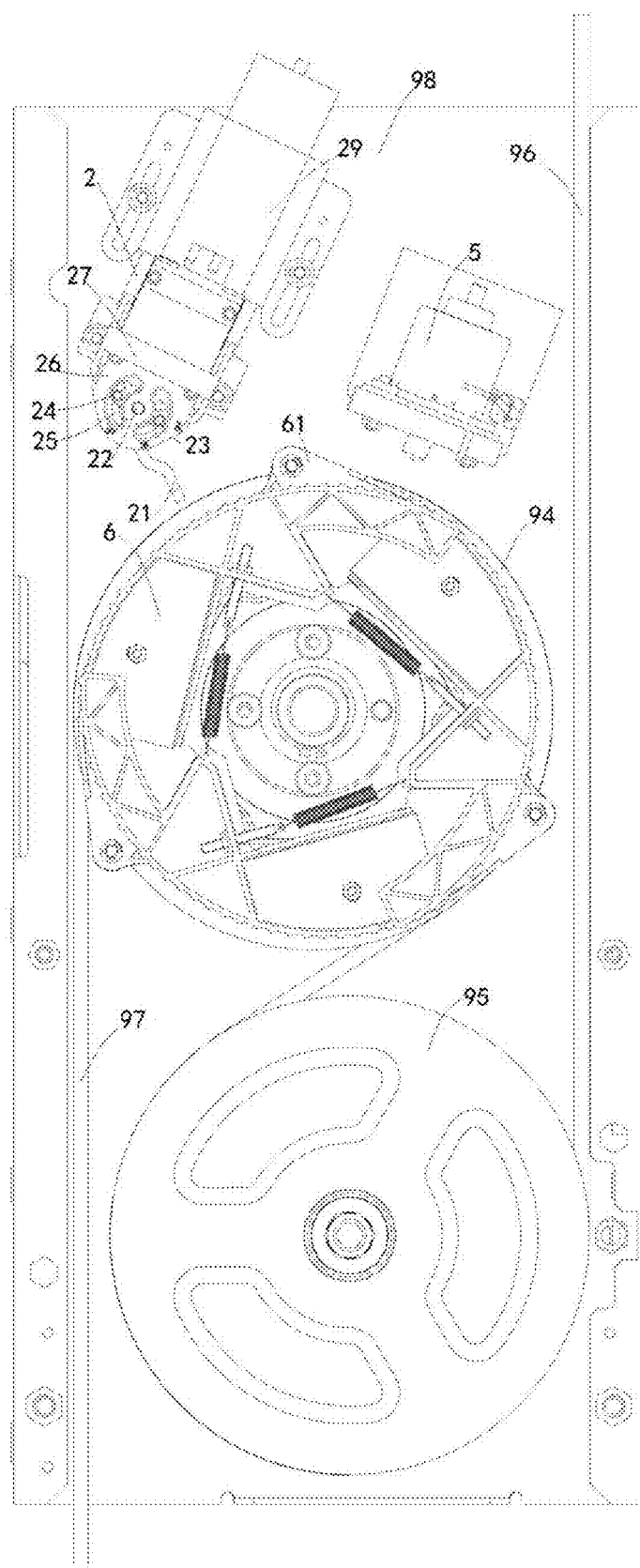
FIG. 2 shows a front view of an overspeed governor assembly according to an embodiment of the present disclosure.
Figure 3:
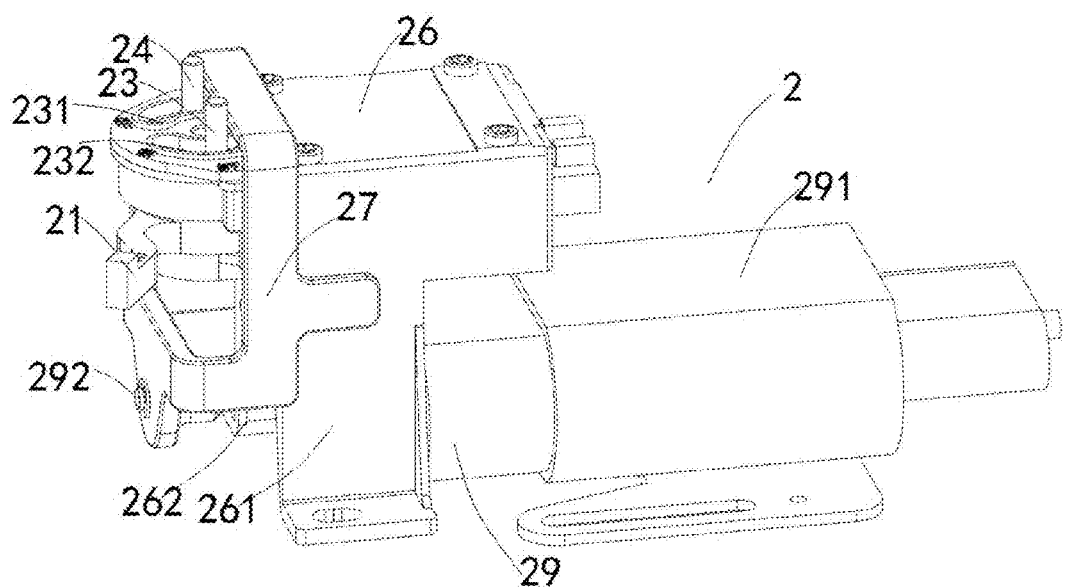
FIG. 3 shows a perspective view of an overspeed protection switch according to an embodiment of the present disclosure.
Figure 6:
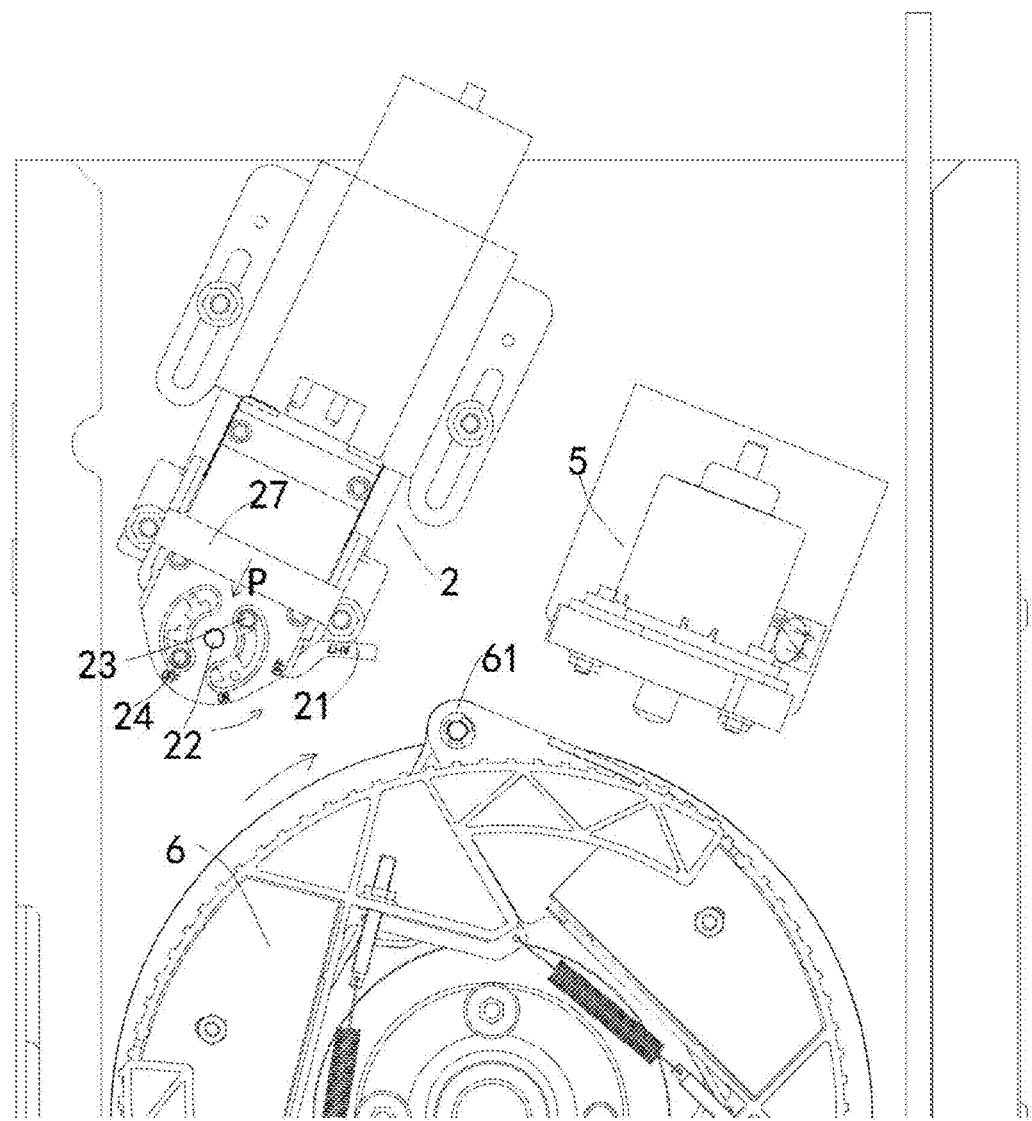
FIGS. 6 to 10 show operational state views of an overspeed governor assembly according to an embodiment of the present disclosure.
Figure 9:
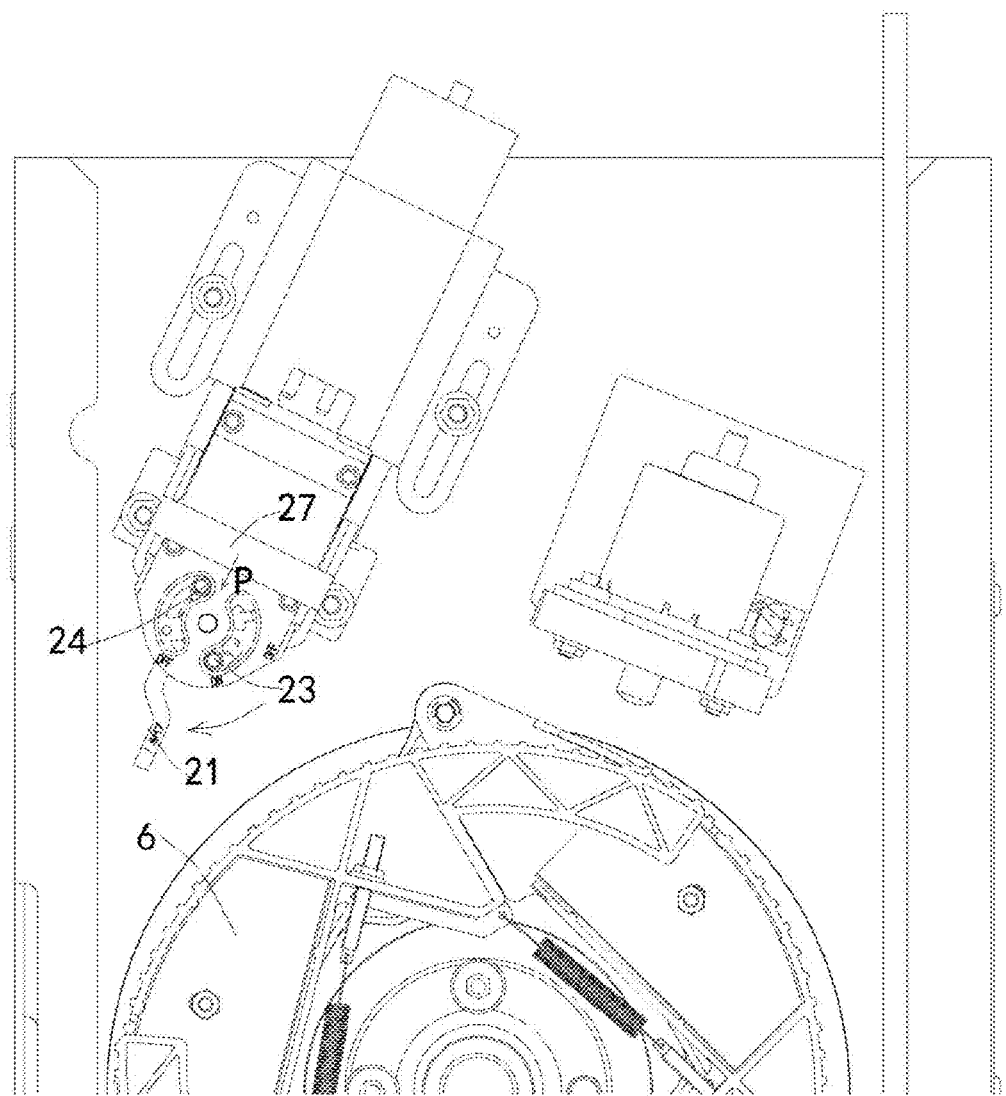

With continued reference to FIG. 2, an overspeed governor assembly according to an embodiment of the present disclosure and an overspeed protection switch therein are illustrated. The overspeed protection switch is a trigger unit of the above electrical brake device. The overspeed governor assembly includes: a rope sheave 94; a centrifugal mechanism 6 mounted on the rope sheave 94 and rotating with the rope sheave 94; and an overspeed protection switch 2 radially outward of the centrifugal mechanism 6 by a certain distance. The overspeed protection switch 2 controls the electrical brake device of the elevator, and when the electrical brake device is triggered, power supply from the elevator drive motor is cut off and the drive sprocket is stopped, thus stopping the car. In addition, the overspeed governor assembly also includes a remote trigger device 5. When the rope sheave 94 rotates with the rope and exceeds a predetermined speed, the centrifugal mechanism 6 will be gradually deployed, and for example a protrusion 61, which is located in the same plane as a trigger member 21, on the centrifugal mechanism 6 will toggle the trigger member 21 of the overspeed protection switch 2 to a triggered position as shown in FIG. 6 or FIG. 9, thereby enabling the electrical brake device to operate and stop the elevator.

A specific structure of the overspeed protection switch 2 according to an embodiment of the present disclosure will now be described in detail with reference to FIGS. 2 to 5. The overspeed protection switch 2 according to the present disclosure includes: a trigger device 26 including a trigger member 21 and at least one protrusion 23, 24, wherein the trigger member 21 is in an untriggered position when the overspeed governor assembly is in normal operation, and is capable of rotating to a triggered position as shown in FIG. 6 from the untriggered position as shown in FIG. 2 when being toggled by the centrifugal mechanism 6 of the overspeed governor assembly in case of overspeed of the overspeed governor assembly. The at least one protrusion 23, 24 are connected to the trigger member 21 and rotate together with the trigger member 21. After the maintenance of the stopped elevator, the trigger member 21 needs to return to the untriggered position. Therefore, the present disclosure provides the following reset mechanism which includes: a reset member 27 and an actuation device 29, wherein the actuation device 29 includes an action end 292 capable of performing a linear movement and for example may be an electromagnet, and the reset member 27 is connected with the action end 292 of the actuation device and is translated with the linear movement of the action end 292 of the actuation device 29 so as to push one of the at least one protrusion 23, 24 to drive the trigger member 21 to return to the untriggered position from the triggered position.

In some embodiments, the at least one protrusion 23, 24 are located on a rotating frame 25, and the trigger member 21 extends from the rotating frame 25. The rotating frame 25 is rotatable along a shaft 22, and is accommodated in a housing of the trigger device 26. As can be seen clearly from FIGS. 3 and 4, at least one protrusion 23, 24 protrude from a front side of the housing and are movable along tracks 231, 232 defined by the housing. On the other hand, the trigger member 21 extends from a side of the housing. In some embodiments, the at least one protrusion 23, 24 include a first protrusion 23 and a second protrusion 24 which are arranged in diametrically opposite positions of the rotating frame 25 (in other words, positions on a straight line passing through the axis of rotation and symmetrical with respect to the axis of rotation). In some embodiments, the actuation device 29 may perform a linear reciprocating movement in response to a reset command (such as a command issued by an operator). In the idle position shown in FIG. 2, the reset member 27 is spaced apart from the at least one protrusion 23, 24, and the reset member 27 is capable of being driven by the actuation device 29 to be translated along the movement direction of the actuation device from the idle position shown in FIG. 2 so that the reset member 27 contacts and acts on one of the at least one protrusion 23, 24 to drive the trigger member 21 to return to the untriggered position from the triggered position.

Figure 4:
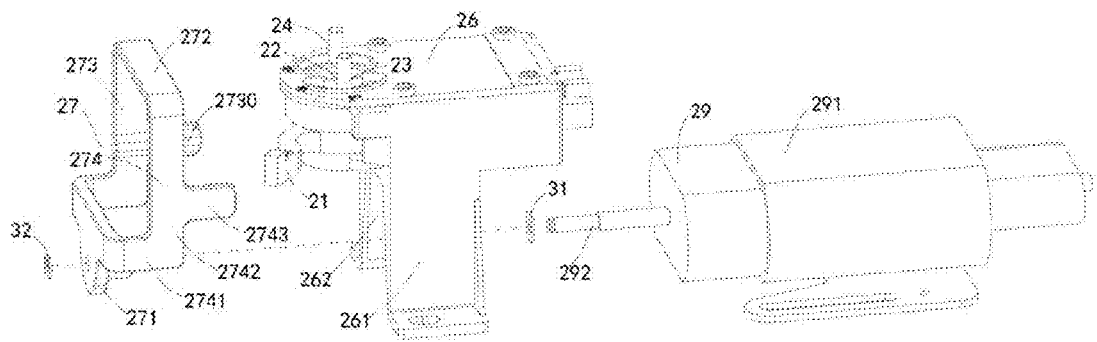
FIG. 4 shows an exploded view of an overspeed protection switch according to an embodiment of the present disclosure.
Figure 5:
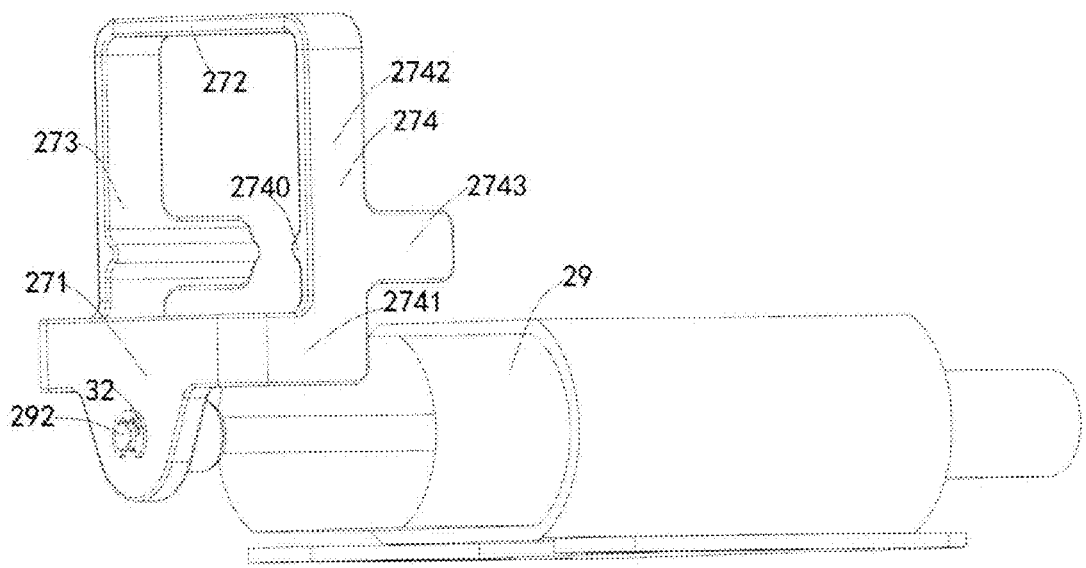
FIG. 5 shows a perspective view of an actuation device and an assembled reset member according to an embodiment of the present disclosure.

In the illustrated embodiment, the actuation device 29 is mounted to an overspeed governor bracket via an actuation device bracket 291. The trigger device 26 may include a leg, such as a pair of legs 261, 262. The trigger device 26 is connected to the overspeed governor bracket 98 via the pair of legs 261, 262 so that the trigger device 26 is located in front of the actuation device 29, the actuation device 29 passes between the pair of legs 261, 262 of the trigger device 26, and the reset member 27 is sleeved over the trigger device 26. In some embodiments, the reset member 27 may include: a connection end 271 connected with the action end 292 of the actuation device 29; a push rod 272 acting on the at least one protrusion; and at least one connection arm connected between the connection end 271 and the push rod 272. In the illustrated embodiment, the at least one connection arm includes a first connection arm 273 and a second connection arm 274 on two sides of the trigger device 26. As shown in FIGS. 4 and 5, in the present embodiment, the reset member 27 is actually of a frame-like shape. In an alternative embodiment, the reset member 27 may have another shape. The connection end 271 of the reset member 27 is fixed to the action end 292 of the actuation device 29 behind the trigger device 26 via a gasket 31 and a snap ring 32. The first connection arm 273 and the second connection arm 274 of the reset member 27 surround the trigger device 26 and extend from the rear side of the trigger device 26 to the front side. The push rod 272 is located on the front side of the trigger device 26 so as to act on at least one protrusion on the front side of the trigger device 26. Such a structure enables the state of the overspeed protection switch to be observed from a front side of the overspeed protection switch. In some embodiments, the first connection arm 273 and the second connection arm 274 form an L-shaped configuration, and includes a first segment 2741 and a second segment 2742 that are perpendicular to each other. Middle portions of the first connection arm 273 and the second connection arm 274 further have longitudinal extension portions 2733 and 2743. Inner sides of the first connection arm and the second connection arm, such as inner sides of the longitudinal extension portions 2733 and 2743, may be provided with longitudinally extending bosses 2730, 2740. This structure helps the reset member 27 to keep stable during translation movement.

In some embodiments, when in the untriggered position shown in FIG. 2, the trigger member 21 is capable of rotating to a first triggered position (shown in FIG. 6) in a first direction or rotating to a second triggered position (shown in FIG. 9) in a second direction, depending on a rotational direction of the centrifugal mechanism 6. In some embodiments, the at least one protrusion 23, 24 include the first protrusion 23 and the second protrusion 24, wherein in the first triggered position, the reset member 27 contacts the first protrusion 23 and drives the trigger member 21 to return to the untriggered position from the first triggered position, and in the second triggered position, the reset member 27 contacts the second protrusion 24 and drives the trigger member 21 to return to the untriggered position from the second triggered position.

Figure 7:
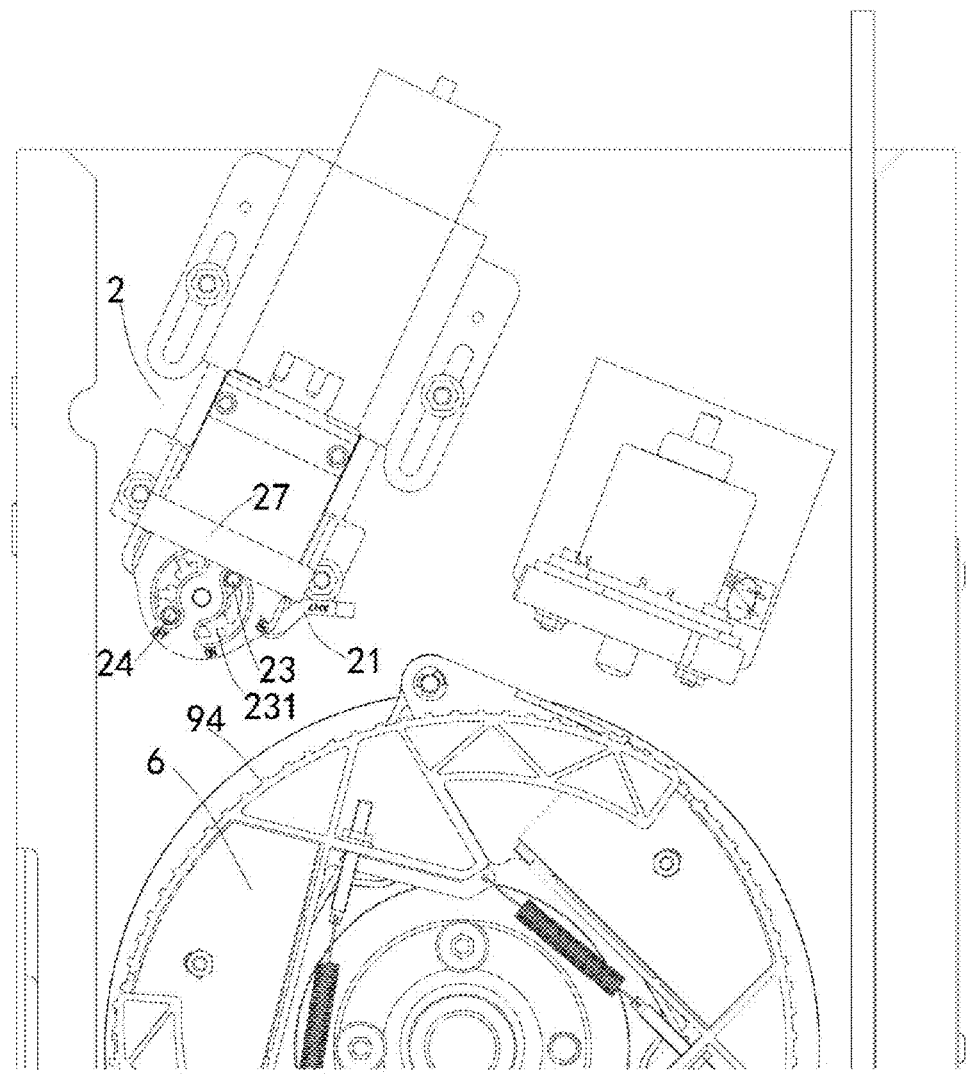
Figure 8:
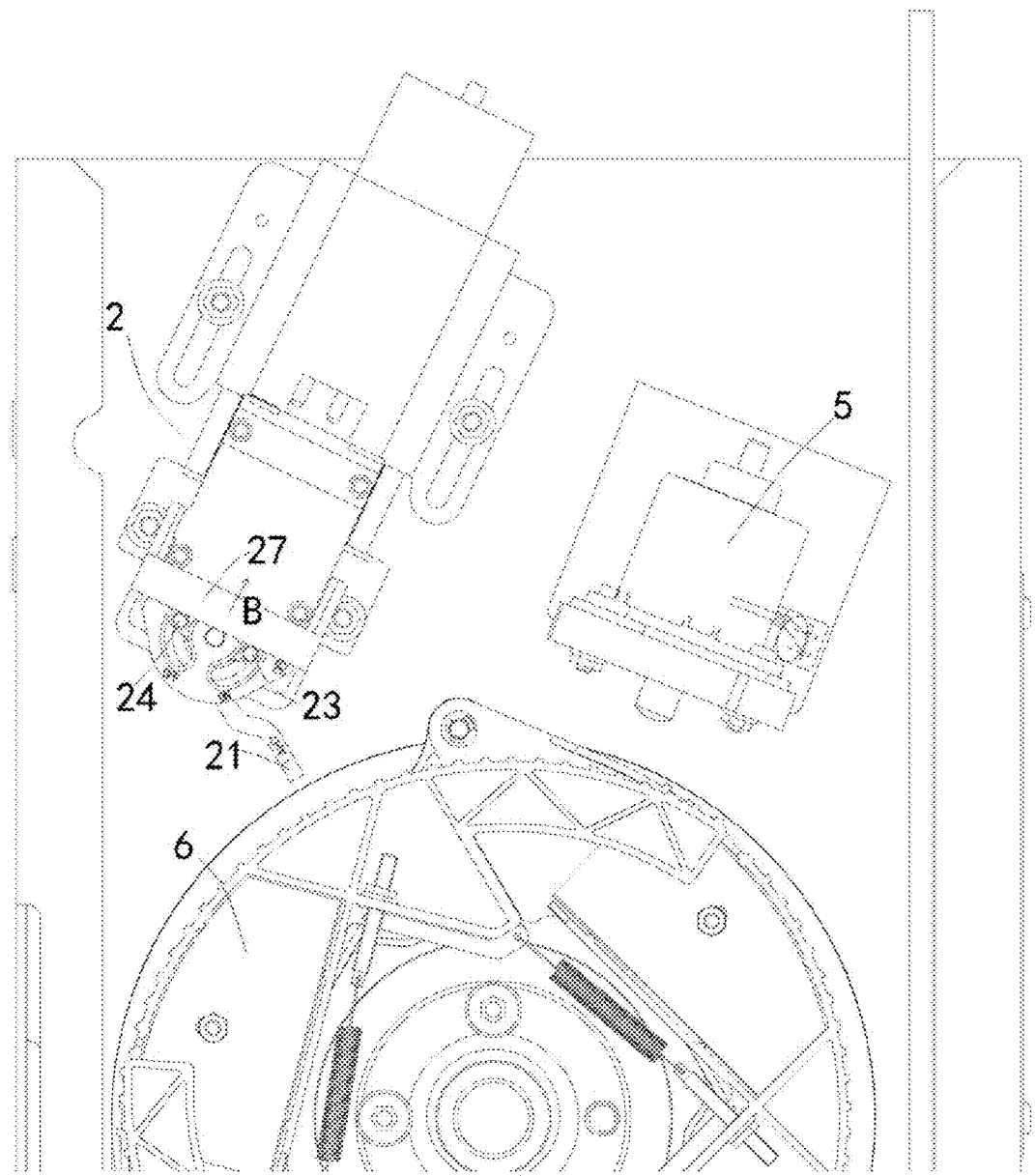

The operational principle of the overspeed protection switch according to an embodiment will be described in detail with specific reference to FIG. 2 and FIGS. 6 to 8. In FIG. 2, the trigger member 21 of the overspeed protection switch 2 is in the untriggered position. Referring to FIG. 6, after the rope sheave rotates clockwise (for example, corresponding to the descending direction of the elevator) in the drawing and exceeds a predetermined speed, the centrifugal mechanism 6 is deployed, and a protrusion 61 thereof contacts and toggles the trigger member 21 in a first direction indicated by the arrow to the first triggered position shown in FIG. 6, thereby braking and stopping the elevator. As the trigger member 21 rotates, the first protrusion 23 and the second protrusion 24 also rotate along tracks defined by the housing to the position shown in FIG. 6. After the maintenance of the stopped elevator, the trigger member 21 needs to be reset, that is, the trigger member 21 has to return from the first triggered position to the untriggered position. A reset command is issued to control the actuation device 29 to drive the reset member 27 to be translated in the direction shown by arrow P to contact and push the first protrusion 23. As shown in FIG. 7, at this point, the actuation device enables the reset member 27 to move in the direction shown by arrow P and contact the first protrusion 23, and then the reset member 27 will further push the first protrusion 23 so that the trigger member 21 rotates back to the untriggered position as shown in FIG. 8. In some embodiments, as shown in FIG. 8, the push rod of the reset member 27 can simultaneously contact the first protrusion 23 and the second protrusion 24 when the trigger member 21 has been pushed by the reset member 27 back to the untriggered position. Subsequently, in some embodiments, when it is sensed that the trigger member 21 has returned to the untriggered position (e.g., it is sensed that the reset member 27 contacts both the first protrusion 23 and the second protrusion 24, and the first protrusion 23 cannot be further pushed to rotate), the reset member 27 may be driven by the actuation device 29 to return in the direction shown by arrow B until it reaches the idle position shown in FIG. 2.

Figure 10:
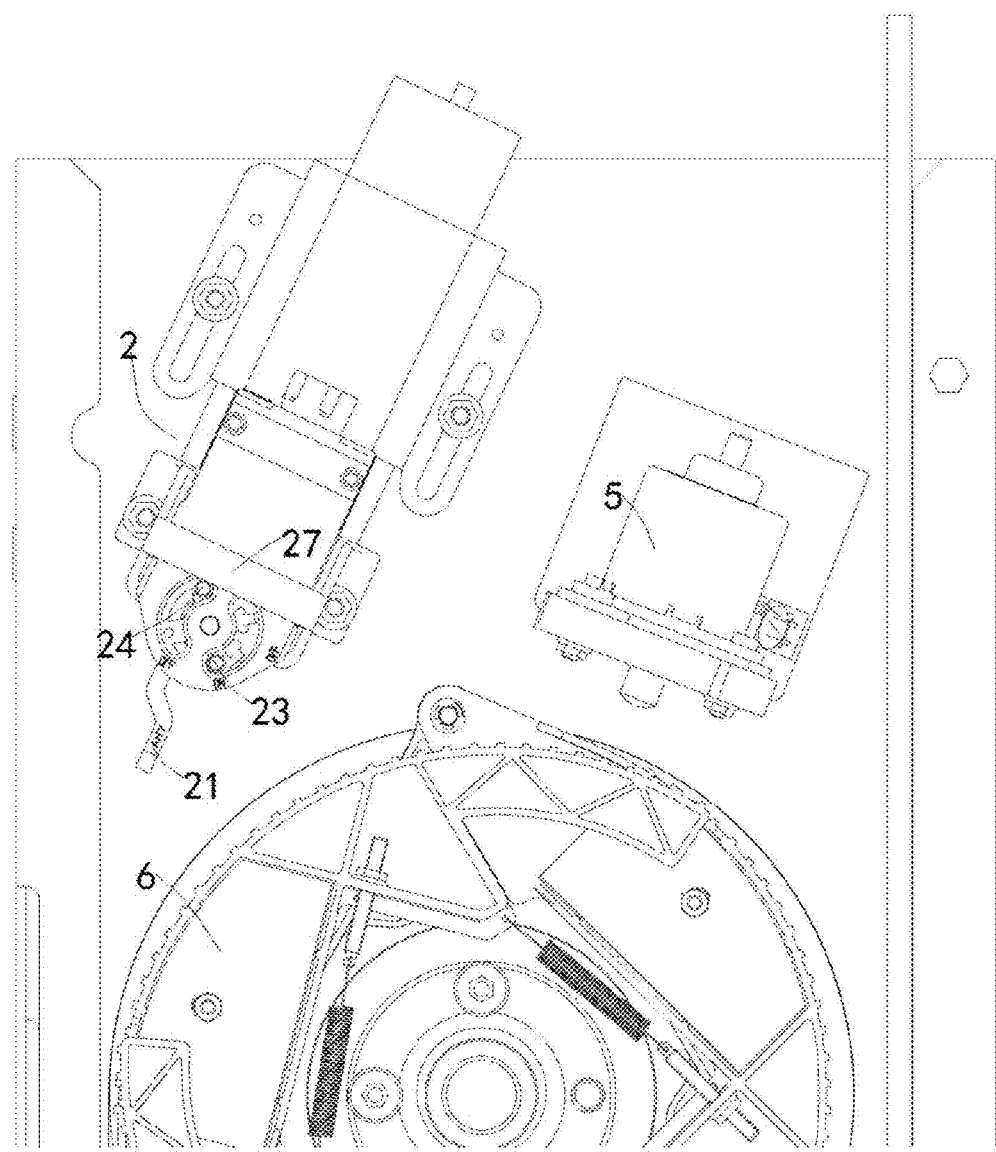

Another condition of the overspeed protection switch according to the present disclosure will be described with reference to FIGS. 2, 9 and 10. In FIG. 2, the trigger member 21 of the overspeed protection switch 2 is in the untriggered position. Referring to FIG. 9, after the rope sheave rotates counterclockwise (for example, corresponding to the ascending direction of the elevator) in the drawing and exceeds a predetermined speed, the centrifugal mechanism 6 is deployed, and the protrusion 61 thereon contacts and toggles the trigger member 21 in a second direction indicated by the arrow to the second triggered position shown in FIG. 9, thereby braking and stopping the elevator. As the trigger member 21 rotates, the first protrusion 23 and the second protrusion 24 also rotate clockwise along the tracks defined by the housing 26 to the position shown in FIG. 9. After the maintenance of the stopped elevator, the trigger member 21 needs to be reset, that is, the trigger member 21 has to return from the second triggered position to the untriggered position. As shown in FIG. 10, at this point, the reset member 27 is translated by the actuation device in the same way to contact the second protrusion 24, and the second protrusion 24 and the trigger member 21 are pushed to rotate back to the untriggered position which is the same as that shown in FIG. 8. Subsequently, in some embodiments, the reset member 27 may return to the idle position shown in FIG. 2 in the direction shown by arrow B.

In another aspect, the present disclosure also intends to provide an elevator system including an overspeed governor assembly according to various embodiments of the present disclosure.

The specific embodiments described above are merely for describing the principle of the present disclosure more clearly, and various components are clearly illustrated or depicted to make it easier to understand the principle of the present disclosure. Those skilled in the art can readily make various modifications or changes to the present disclosure without departing from the scope of the present disclosure. It should be understood that these modifications or changes should be included within the scope of protection of the present disclosure.

What is claimed is:

1. An overspeed protection switch, comprising:
a trigger device comprising a trigger member and at least one protrusion, wherein the trigger member is capable of rotating to a triggered position from an untriggered position when being toggled, and the at least one protrusion is connected to the trigger member and rotates together with the trigger member;
an actuation device comprising an action end capable of performing a linear movement; and
a reset member which is connected with the action end of the actuation device and is translated with the linear movement of the action end of the actuation device so as to push one of the at least one protrusion to drive the trigger member to return to the untriggered position from the triggered position;
wherein the reset member comprises:
a connection end connected with the action end of the actuation device;
a push rod acting on the at least one protrusion; and
at least one connection arm connected between the connection end and the push rod, wherein the at least one connection arm comprises a first connection arm and a second connection arm that surround the trigger device.

2. The overspeed protection switch according to claim 1, wherein the connection end of the reset member is located behind the trigger device and the push rod is located in front of the trigger device.

3. The overspeed protection switch according to claim 2, wherein the first connection arm and the second connection arm form an L-shaped configuration, middle portions of the first connection arm and the second connection arm have longitudinal extension portions, and inner sides of the first connection arm and the second connection arm are provided with longitudinally extending bosses.

4. The overspeed protection switch according to claim 1, wherein the trigger member is capable of rotating to a first triggered position in a first direction or rotating to a second triggered position in a second direction, and the at least one protrusion comprises a first protrusion and a second protrusion, wherein in the first triggered position, the reset member contacts the first protrusion and drives the trigger member to return to the untriggered position from the first triggered position, and in the second triggered position, the reset member contacts the second protrusion and drives the trigger member to return to the untriggered position from the second triggered position.

5. The overspeed protection switch according to claim 4, wherein the trigger device comprises a housing and a rotating frame in the housing, the trigger member has an outer end and an inner end, and the inner end of the trigger member is connected to the rotating frame; the first protrusion and the second protrusion are arranged on the rotating frame, and extend to the outside of the housing through a track of the housing; and when the trigger member has been pushed by the reset member back to the untriggered position, the reset member contacts the first protrusion and the second protrusion simultaneously.

6. An overspeed governor assembly, comprising:
a rope sheave;
a centrifugal mechanism mounted on the rope sheave and rotating together with the rope sheave; and
an overspeed protection switch radially outward of the centrifugal mechanism by a certain distance, the overspeed protection switch comprising:
a trigger device comprising a trigger member and at least one protrusion, wherein the trigger member is in an untriggered position when the overspeed governor assembly is in normal operation, and is capable of rotating to a triggered position from the untriggered position when being toggled by the centrifugal mechanism of the overspeed governor assembly in case of overspeed of the overspeed governor assembly, and the at least one protrusion is connected to the trigger member and rotates together with the trigger member;
an actuation device comprising an action end capable of performing a linear movement; and
a reset member which is connected with the action end of the actuation device and is translated with the linear movement of the action end of the actuation device so as to push one of the at least one protrusion to drive the trigger member to return to the untriggered position from the triggered position;
wherein the reset member comprises:
a connection end connected with the action end of the actuation device;
a push rod acting on the at least one protrusion; and
at least one connection arm connected between the connection end and the push rod, wherein the at least one connection arm comprises a first connection arm and a second connection arm that surround the trigger device.

7. The overspeed governor assembly according to claim 6, wherein the connection end of the reset member is located behind the trigger device and the push rod is located in front of the trigger device.

8. The overspeed governor assembly according to claim 7, wherein the first connection arm and the second connection arm form an L-shaped configuration, middle portion of the first connection arm and the second connection arm have longitudinal extension portions, and inner sides of the first connection arm and the second connection arm are provided with longitudinally extending bosses.

9. The overspeed governor assembly according to claim 6, wherein the trigger device is connected to an overspeed governor bracket via legs so that the trigger device is located in front of the actuation device.

10. The overspeed governor assembly according to claim 6, wherein when in the untriggered position, the trigger member is capable of rotating to a first triggered position in a first direction or rotating to a second triggered position in a second direction, depending on a rotational direction of the centrifugal mechanism; the at least one protrusion comprises a first protrusion and a second protrusion, wherein in the first triggered position, the reset member contacts the first protrusion and drives the trigger member to return to the untriggered position from the first triggered position, and in the second triggered position, the reset member contacts the second protrusion and drives the trigger member to return to the untriggered position from the second triggered position.

11. The overspeed governor assembly according to claim 10, wherein the trigger device comprises a housing and a rotating frame in the housing, the trigger member has an outer end and an inner end, and the inner end of the trigger member is connected to the rotating frame; the first protrusion and the second protrusion are arranged on the rotating frame, and extend to the outside of the housing through a track of the housing; and when the trigger member has been pushed by the reset member back to the untriggered position, the reset member contacts the first protrusion and the second protrusion simultaneously.

12. An elevator system, comprising the overspeed governor assembly according to claim 6.

* * * * *